(12) United States Patent
Whalen

(10) Patent No.: US 9,155,326 B2
(45) Date of Patent: Oct. 13, 2015

(54) OAT-DERIVED SWEETENER

(75) Inventor: Paul Whalen, Rapid City, SD (US)

(73) Assignee: Oat Tech, Inc., Rapid City, SD (US)

( * ) Notice: Subject to any disclaimer, the term of this patent is extended or adjusted under 35 U.S.C. 154(b) by 0 days.

(21) Appl. No.: 13/523,463

(22) Filed: Jun. 14, 2012

(65) Prior Publication Data

US 2013/0149413 A1    Jun. 13, 2013

Related U.S. Application Data

(60) Provisional application No. 61/496,839, filed on Jun. 14, 2011.

(51) Int. Cl.
*A21D 2/00* (2006.01)
*A23L 1/10* (2006.01)
*A23L 1/09* (2006.01)
*A23L 1/185* (2006.01)

(52) U.S. Cl.
CPC *A23L 1/095* (2013.01); *A23L 1/185* (2013.01)

(58) Field of Classification Search
CPC ............................... A23L 1/095; A23L 1/185
USPC ...................................... 426/28, 18
See application file for complete search history.

(56) References Cited

U.S. PATENT DOCUMENTS

| 3,194,682 | A |   | 7/1965  | Tippens |         |
|-----------|---|---|---------|---------|---------|
| 3,689,277 | A | * | 9/1972  | Morton et al. | 426/11 |
| 4,069,103 | A |   | 1/1978  | Muller  |         |
| 4,234,349 | A |   | 11/1980 | Suzor   |         |
| 4,496,605 | A |   | 1/1985  | Targan  |         |
| 4,804,545 | A | * | 2/1989  | Goering et al. | 426/28 |
| 4,857,339 | A |   | 8/1989  | Maselli et al. |   |
| 5,468,491 | A | * | 11/1995 | Targan  | 424/750 |
| 6,395,314 | B1 |  | 5/2002  | Whalen  |         |
| 6,685,974 | B2 | * | 2/2004 | Whalen  | 426/52 |
| 7,709,033 | B2 |  | 5/2010  | Kvist et al. |    |
| 7,858,139 | B2 |  | 12/2010 | Kvist et al. |    |
| 7,910,143 | B2 |  | 3/2011  | Kvist et al. |    |
| 2002/0018830 | A1 | | 2/2002 | Whalen  |         |
| 2005/0136162 | A1 | | 6/2005 | Kvist et al. |   |
| 2009/0047385 | A1 | | 2/2009 | Hansa   |         |
| 2009/0074935 | A1 | | 3/2009 | Lee     |         |
| 2009/0259018 | A1 | | 10/2009| Barrows et al. |  |
| 2010/0260889 | A1 | | 10/2010| Elvig   |         |

FOREIGN PATENT DOCUMENTS

| WO | 2009/047385 | 2/2009 |
| WO | 2009074935  | 3/2009 |
| WO | 2012/042486 | 9/2012 |
| WO | 2010/260889 | 10/2012|

OTHER PUBLICATIONS

Rajendran, S. et al. Mechanism of solvent-induced thermal stabilization of alpha-amylase from Bacillus amyloliquefaciens.Int J Pept Protein Res. Feb. 1995;45(2):122-8. ( Abstract).*
OatSweet (trademarked), Press Release [on-line]. Oat Tech, 2011. Retrieved from <URL: http:www.oat-tech.com/oatsweet/>.
Extended European Search Report and Written Opinion (PCT/US2014) dated May 3, 2015—4 pages.

* cited by examiner

*Primary Examiner* — Nikki H Dees
*Assistant Examiner* — Subbalakshmi Prakash
(74) *Attorney, Agent, or Firm* — Dicke, Billig & Czaja PLLC

(57) ABSTRACT

A process for forming a syrup product that is suitable for use in a food product. A base formulation is prepared having a major amount of an oat material or waxy barley hybrid. The base formulation is mixed with water to form a slurry. At least one enzyme is mixed into the slurry. The slurry is cooked to convert the slurry into an intermediate product. The intermediate product is evaporated to produce a syrup product having a solids level of at least 65 Brix.

17 Claims, No Drawings

OAT-DERIVED SWEETENER

REFERENCE TO RELATED APPLICATION

This application claims priority to U.S. Provisional Application No. 61/496,839, which was filed on Jun. 14, 2011, the contents of which are incorporated herein by reference.

FIELD OF THE INVENTION

The invention relates generally to an oat-derived food product. More particularly, the invention relates to an oat-derived sweetening food product.

BACKGROUND OF THE INVENTION

Consumers are increasingly concerned about purchasing and consuming products that the consumers view as being more healthful. For example, products possessing higher levels of complex carbohydrates and fiber, especially soluble fiber, are becoming more popular with consumers.

In addition, products containing lower levels of fat and cholesterol as well as a decreased caloric content are becoming more popular with consumers. Many consumers also desire products made from all-natural components that contain no stabilizers, emulsifiers, or other exogenous additives, such as refined sugars or artificial sweeteners.

One drawback of food products produced for the health conscious market is that they tend to be less sweet than conventional food products. One technique that has been used to overcome this drawback and thereby make such food products appeal to a greater portion of society is to add sweeteners, such as sucrose, glucose syrup, and high fructose corn syrup.

Even though the addition of the sweeteners increases the appeal of the food products to some segments of the health conscious market, these products are not desired by consumers who exclude refined or artificial sweeteners from their diet.

An article by Janet Raloff (Beyond Oat Bran, Food Technology 1991 vol. 8, page 62) describes the physiological benefits of consuming an oat-based product, which is identified by the name Oatrim. The oat-based product is formulated from either oat bran or oat flour. The article indicates that the odorless and nearly tasteless oat-based product is particularly suited as a fat replacement in low-temperature applications, such as frozen confections.

Oat-based food products are described in Inglett, U.S. Pat. Nos. 4,996,063 and 5,082,673. A mixture of oats and water is gelatinized by passage through a steam injection cooker at a temperature of between 138° C. and 143° C. After the pH of the mixture is adjusted, alpha-amylase is added to hydrolyze the starch in the mixture.

Once hydrolyzation is complete, soluble fiber is separated from the mixture. Finally, the soluble fiber is dehydrated to provide the oat-based food product. Examples in the Inglett patents indicate that the oat-based food product is mixed with additional components, such as milk and sugar, to formulate the frozen confection.

Mitchell et al., U.S. Pat. No. 4,744,992, discloses using a dual enzyme method, which includes liquefying and saccharifying rice, to produce a high glucose syrup. Examples in the Mitchell et al. patent indicate that when the syrup is incorporated into a frozen confection, vegetable oil in a concentration of approximately 10 percent by weight of the frozen confection as well as stabilizers are added to provide the frozen confection with a creamy texture. Mitchell et al. also indicates that liquefaction is performed at a temperature of approximately 80° C.

Whalen et al., U.S. Pat. Nos. 6,685,974; 6,589,589; 6,395,314; 5,989,598 and 5,723,162 each describe a process for preparing an oat-based functional syrup and then forming an oat-based frozen confection from the oat-based functional syrup. The contents of the preceding patents are expressly incorporated herein by reference.

SUMMARY OF THE INVENTION

An embodiment of the invention relates to preparing an oat-based functional syrup. The process includes milling an oat material to produce a base formulation. Material having a granulation of more than #100 U.S. mesh is separated from the base formulation. The base formulation is mixed with water to form a slurry. Next, effective amounts of alpha-amylase enzyme and glucoamylase enzyme are mixed into the slurry. The slurry is then cooked to convert the slurry into a syrup. The syrup is substantially flavorless. A condensed, high solids syrup with unique sweetening and flavor characteristics is then formed from the oat-based functional syrup.

DETAILED DESCRIPTION OF THE PREFERRED EMBODIMENTS

An embodiment of the invention is directed to forming a condensed, high solids syrup with unique sweetening and flavoring characteristics from an oat-based functional syrup. The term functional indicates that the oat-based functional syrup has certain characteristics that make this product useful in fabricating food products and beverages.

As the product thereby produced using the concepts disclosed herein is fabricated from oats, it is perceived as being more valuable than syrups may from other materials such as soy.

The oat-based functional syrup of the invention has several advantages over prior art syrup bases. The oat syrup of the present invention is substantially flavorless. The oat syrup of the present invention may have a nearly white color. Additionally, the oat syrup may exhibit desirable sweetness, texture, and mouthfeel characteristics when formed into food products such as non-dairy frozen confections without exogenous sweeteners, stabilizers, emulsifiers, or proteins, which are commonly used in prior art non-dairy frozen confections.

As used herein, the term "mouthfeel" refers to a creamy sensation that a person experiences in one's mouth upon consuming conventional ice cream. As used herein, the term "exogenous" refers to components that are added to prior art food products and beverages to supplement or modify the characteristics of the prior art food products and beverages.

The properties of the oat-based functional syrup are dictated by the particular oat or grain components selected. It has been found that using a low bran flour, which is substantially reduced in bran while retaining soluble fiber glucans, provides the food products and beverages with desired characteristics.

The term "bran," as used herein, refers to the dark fibrous component found in ground oat flour. The typical compositional analysis of low bran oat flour is similar to whole oat flour for moisture, protein, and fat as illustrated in Table 1, which is set forth below.

TABLE 1

| Composition (weight percent) | Whole Oat Flour | Low Bran Oat Flour | Fine Oat Flour |
| --- | --- | --- | --- |
| Moisture | 11 | 11 | 10 |
| Protein | 18 | 15 | 10 |
| Fat | 7 | 7 | 6 |
| Total Dietary Fiber | 9 | 10 | 4-7 |
| Beta-Glucan | 4 | 7 | 2-4 |

While it is also possible to use oats or grains having a significant hull, bran or husk portion to formulate the oat-based functional syrup, syrup formed from these materials may need to be separated from insoluble branny particles present in the oat-based functional syrup before the food product or beverage is produced from the syrup.

As an alternative to using the oats in the form of flour, it is also possible to practice the present invention with other forms of oats, such as rolled oats, partially milled oats, and oatmeal. These various forms of oats are collectively identified as "oat material".

One particular oat flour possessing a low level of bran or hull material is fine oat flour. Fine oat flour is a fraction of the whole oat flour obtained from a sieving or air classification process.

The typical compositional analysis of fine oat flour is similar to whole oat flour for moisture, protein, and fat, as illustrated in Table 1. Fine oat flour also retains a substantial percentage of the soluble fiber that is present in whole oat flour. However, fine oat flour contains less bran or insoluble fiber and more starch than whole oat flour.

The various fractions formed in the oat milling stream produce food products and beverages with varied characteristics. The fractions high in soluble fiber, including whole oat flour and oatmeal, tend to give very smooth and somewhat "dry" texture to soft-serve frozen dessert, while those higher in starch content tend to provide more sweetness.

It will be apparent to those skilled in the art that a desired set of finished product characteristics may be obtained by selecting an appropriate oat starting material or blend of available oat milling fractions. For example, the frozen confection may be formed from a mixture of fine oat flour and whole oat flour. Oat mill products possessing these characteristics can be obtained from various sources including Conagra, Inc. (Council Bluffs, Iowa) or Grain Millers (Minneapolis, Minn.).

It has also been found that a waxy barley hybrid flour also provides advantageous results when used with the present invention. The waxy barley hybrid is a hull-less barley that may be selected from the prowashneupana variety, which can be obtained from Conagra, Inc. (Council Bluff, Iowa). The typical compositional analysis for the prowashneupana waxy barley hybrid is set forth in Table 2.

TABLE 2

| Composition (weight percent) | Waxy Barley Hybrid Flour |
| --- | --- |
| Moisture | 14 |
| Protein | 20 |
| Fat | 7 |
| Total Dietary Fiber | 29 |
| Beta-Glucan | 14 |

Other starch sources can be used in conjunction with the oat flour or waxy barley hybrid flour to adjust the flavor and sweetness of the food products and/or beverages. While other starch sources may be used in the preparation of the food products and beverages, the other starch sources may only represent a minor portion of oat or grain material (up to 49 percent by weight) that is used to prepare the food products and beverages.

The oat flour and the waxy barley hybrid flour comprise a major portion of the oat or grain material (50 percent by weight or more) that is used to prepare the oat-based functional syrup. In certain embodiments, the oat flour and the waxy barley hybrid flour comprise between about 50 and about 80 percent by weight of the material used to prepare the oat-based functional syrup.

Examples of starch sources that are suitable for use in the present invention include flours, such as corn flour, wheat flour, rice flour, and potato flour. It is believed that the addition of other starch sources to the oat flour or waxy barley hybrid flour does not affect the functional properties of the food products and beverages, such as texture and mouthfeel characteristics.

As a preliminary step in the preparation of the oat-based functional syrup, the oat flour or waxy barley hybrid flour is milled to a fine granulation. Next, the ground material is subjected to a separation technique to remove the larger size particles.

The separation technique may remove substantially all of the ground material that is larger than #100 U.S. mesh. In certain embodiments, the separation technique removes substantially all of the ground material that is larger than #250 U.S. mesh.

Since the bran portion of the oat material typically has a particle size that is greater than this range, a significant portion of the bran portion may be removed from the oat material through the separation technique. In certain embodiments, the separation technique reduces the concentration of the bran component by at least 30 percent by weight. In other embodiments, the separation technique reduces the concentration of the bran component by at least 50 percent by weight.

The presence of the bran may cause the syrup and subsequent products made from the syrup to be darker in color. Removal of the insoluble fiber results in a lighter colored syrup when cooked by the procedure delineated below. Using an oat material with these characteristics may also enhance the texture of the syrup product.

Additionally, using an oat material with these characteristics may remove the need for a filtration step that was previously required to produce a syrup product with desirable characteristics. This is a major processing advantage since it is far easier to remove and prevent the effects of the bran in the syrup prior to the hydrolysis process. A final filter may be done but it is not a required step, only a quality assurance step.

Separation may be performed with sieve screening or air classification. While both sieve screening and air classification result in very small size material, in certain embodiments sieve screening may result in a higher quality product.

The starch sources are mixed with the oat material to prepare a substantially homogeneous base formulation. A person of ordinary skill in the art will appreciate that the oat material and the starch sources may be mixed together before or after the grinding and separating steps.

A slurry is formed by mixing the base formulation into water in an amount that is effective to provide a solids level of between about 25 percent and about 33 percent on a dry matter basis. In certain embodiments, the water is potable tap water that is provided at a temperature of about 10° C.

Changing the solids level may allow the sweetness of the oat-based functional syrup to be adjusted. For example, increasing the solids level may cause an increase in the starch component, which may increase the sweetness of the oat-based functional syrup.

The cook process may include a one-step procedure. An advantage of the one-step procedure is a reduction of processing time. Surprisingly, this combined enzyme procedure also results in a thinner syrup and a more rapid sugar formation.

An advantage to this cook process is the minimization of browning products normally formed in cook processes containing high reducing sugar. These products are common and form by the well-known Maillard reaction of reducing sugars and protein. When these off-colors are generated, it may be necessary to use reaction processes like activated charcoal to reduce the off-color.

The oat slurry or mixture may be cooked at as low a temperature as possible to minimize flavor defects from bran as well as other components of the oat flour (protein, fat, etc.). In certain embodiments, the cook temperature is between about 60° C. and about 70° C. In other embodiments, the cook temperature is between about 65° C. and 70° C. In still other embodiments, the cook temperature is about 68° C. Using temperatures in excess of this range (i.e., above 70° C.) may result in flavor and color defects.

The heating to the cook temperature may be done relatively slowly over a period of greater than about 15 minutes. In certain embodiments, the heat to the cook temperature may be done over a period of time of between about 30 minutes and about 60 minutes. Heating of this period of time may minimize the development of off flavors.

Using glucoamylase in conjunction with alpha-amylase may result in an improved thinning or liquefying action. The combined use of glucoamylase and alpha-amylase may also produce rapid sugar formation from the oat material. Additional glucoamylase can be added for higher conversion of starch to sugar and a higher sweetness level.

This procedure may result in a higher conversion rate to glucose and a savings in processing time. By decreasing the total thermal exposure of the oat base, the formation of off-flavors from remaining bran and other components in the oat flour may be reduced.

The fine oat flour may be added along with a standard amount of low temperature active alpha-amylase (Genencor SPEZYME LT-75 or Novo BAN) plus an increased amount of glucoamylase that is about twice the conventionally recommended concentration. The enzymes work in conjunction to increase the rate at which glucose is formed.

In certain embodiments, the alpha-amylase may be alpha-1,4-glucan, 4-glucanohydrolase, which is derived from *Bacillus subtilis*. The alpha-amylase may not only produce liquefaction in a random fashion over a broad range of temperatures (between about 65° C. and 92° C.) but also retain its activity when used at temperatures of less than 80° C.

The alpha-amylase may be added to the slurry at a rate of between about 0.50 and 1.25 grams per pound of oat material. In certain embodiments, the alpha-amylase is added at a concentration of about 0.75 grams per pound of oat material. The alpha-amylase may be food grade alpha-amylase, which can be obtained from Genencor International (Rochester, N.Y.) under the designation SPEZYME LT-75.

The dextrin may be converted into glucose using glucoamylase. The glucoamylase is also referred to as fungal 1,4-alpha-D-glucan glucohydrolase, which can be obtained from Genencor International (Rochester, N.Y.) under the designation SPEZYME GA 300.

The glucoamylase may be added to the slurry at a rate of between about 0.50 and 5.0 grams per pound of oat material.

In certain embodiments, the glucoamylase is added to the slurry at a rate of about 2.15 grams per pound of oat material.

By increasing the glucoamylase concentration, it may be possible to attain higher glucose levels. Such higher glucose levels may be required for taste in a shorter time and reduce or eliminate off-flavors formed during the longer hold times normally employed for the glucoamylase.

Using the one-step procedure of the present invention may result in a significant reduction in the total processing time, which not only reduces the processing costs but also reduces the off-flavors generated by prolonged exposure of the oat-based functional syrup to increased temperatures.

After the syrup product obtains a desired degree of sweetness, the syrup product may be cooled to a temperature of less than about 30° C. to provide the oat-based functional syrup with a desired conversion level. In certain embodiments, the syrup product may be cooled to a temperature of approximately 10° C.

The syrup product is clean and bland with no off-flavors. If it is desired to increase the fructose concentration in the oat-based functional syrup, the oat-based functional syrup may be subjected to an isomerization step using techniques that are conventionally known in the art.

As noted above, producing an oat-based functional syrup that has a nearly white color enhances the ability to incorporate the oat-based functional syrup into a variety of products. It has been found that subjecting the oat-based functional syrup to clarification lightens the color of the oat-based functional syrup so that the oat-based functional syrup is nearly white.

Depending on the product that is to be made with the oat-based functional syrup, the oat-based functional syrup may be diluted with water to have a consistency (about 14 percent by weight solids) that is similar to milk prior to performing clarification. Alternatively, the oat-based functional syrup may be concentrated to have a solids concentration that is greater than about 30 percent by weight.

During the clarification step, the oat-based functional syrup may be run through a simple milk clarifier, which is also known as a cream separator. The oat-based functional syrup exiting the milk clarifier is almost white in color.

The extent to which the color of the oat-based functional syrup is lightened may depend upon the residence time of the oat-based functional syrup in the milk clarifier. A longer residence time may result in a paler, weaker colored product that is similar to skim milk.

The length of the clarification process may also depend on the G force used in the clarifier. For example, subjecting the oat-based functional syrup to a G force of about 2,000 G for less than one minute may remove a significant amount of suspended material. Higher G forces (4,500 G) result a paler, lighter colored product. The amount of force imparted in a conventional clarifier may be between 7,000 and 8,500 G.

Product resulting from the clarification step may have an improved color. For example, a white product is easier to color. Some improvement in taste is also apparent, especially in a diluted or milk formula (14 percent by weight solids). However, it has been found that extensive clarification of the syrup intended for frozen desserts may remove some of the desired texture qualities—smoothness and mouthfeel—and, therefore, may not be recommended.

The oat-based functional syrup may be used to prepare food products and/or beverages. The oat-based functional syrup may then be flavored as desired using flavoring ingredients that are known in the art such as vanilla or cocoa.

The flavor of the oat-based functional syrup may be enhanced by the addition of a small concentration of a flavor enhancer. Various flavor enhancers are known in the art and are selected based upon the particular flavoring ingredients that are used in the food products and/or beverages.

It is also possible to enhance the flavor of the food products and/or beverages made from the oat-based functional syrup by adding salt in a concentration of up to 1 percent by weight. In certain embodiments, the salt is provided at a concentration of about 0.35 percent by weight of the oat-based functional syrup.

Adding salt to the oat-based functional syrup after the oat-based functional syrup is formed may minimize off-flavors resulting from the addition of the salt while the oat-based functional syrup is being prepared.

After the above basic conversion steps are performed and the desired conversion level (low DE equivalent to about 20 or high DE equivalent to about 60) or sweetness level, the slurry may be run through a separator to remove any coarse solids while leaving other components that are more soluble such a protein, some fiber and fat (naturally emulsified). In certain embodiments, the separator is a decanter.

The decantant material may be transferred by pumping to an evaporator system. The evaporator system may have a variety of configurations, examples of which include single effect, double effect and triple effect.

To allow holding the decantant material in a surge vessel prior to evaporation, the decantant material can be pasteurized. An example of one such suitable pasteurization technique includes high temperature short time (HTST) pasteurization.

The solids content of the oat-based functional syrup may be increased by reducing the moisture content of the product. An example of one suitable technique that may be used to reduce the moisture content is evaporation. In certain embodiments, the evaporation may be performed at a temperature of about 50° C. and a vacuum of about 70 centimeters of mercury.

In some applications it may be desirable to use a syrup with a lower sugar level to primarily function in food formulations to bind ingredients with the syrup such as in food bars. In such situations, the syrup may be between about 50% and 25% as sweet as a fully converted syrup. In a fully converted syrup, substantially all the starch has been enzymatically converted to sugars.

These lower sweetness syrups are commonly referred to in the industry as low dextrose equivalent syrups or low DE syrups. The dextrose equivalent is the percent solids measured as dextrose divided by the remaining starch solids.

Syrups with a DE of 42 are most common but higher (DE 60) and lower (DE 26) are used for specific applications as well. Low DE syrups represent partial conversion to lower levels of sugars as glucose or maltose.

A slurry is formed by mixing oat flour with water to provide a relatively low solids level. In certain embodiments, the slurry has an oat flour concentration of about 15 percent by weight. This lower solids formulation is converted as is discussed in U.S. Pat. No. 6,685,974.

The converted mixture is decanted as discussed above and then subjected to mechanical separation. In certain embodiments, the mechanical separation is done using a centrifuge. An example of one such centrifuge that may be used in conjunction with the mechanical separation is a stacked disk centrifuge, which is commercially available from a variety of companies such as Alfa Laval. The mechanical separation process enables finer material to be removed from the decantant. The clarified decantant thereby is more similar to conventional corn syrup.

The lower solids concentration of about 15 percent by weight results in a much less viscous slurry and conversion syrup than higher solids formulations which significantly increases the ability of the centrifuge to remove solids and result in a higher clarified product. The clarified product is also less turbid.

The slurry having a solids concentration of about 15 percent by weight is converted to, for example, 4.2% glucose, the enzyme reaction largely stopped by cooling the slurry to less than about 27° C. The cooled slurry is then centrifuged using the decanter to remove the coarser or heavier suspended material. Next, the decantant is transferred to a stacked disk centrifuge and metered such as to further remove suspended or colloidal material. This process resulted in a clarified light syrup.

The final clarified light syrup is then heat treated per HTST (high temperature short time pasteurization) or similar treatments so as to 'kill' the enzyme activity by exceeding 82° C. and holding at such temperature for the kill to be substantially effective. In certain embodiments, the hold time was up to about 5 minutes. This process also serves to pasteurize the product. A longer hold time or exposure to heat can be done at this stage of the process without deleterious effects. The glucose content changed slightly to about 5.2%.

The syrup is then condensed to 50 Brix and caramelized as below or, alternatively, simply condensed without the caramelization step to a solids concentration of at least about 80% for a low water activity, microbially stable product. In certain embodiments, the final product has a DE of about 42. Lower DE syrups are simply cooled to stop sugar formation sooner to result in a lower sugar content.

Dilute slurry syrups can also be made using the process described above but starting at a higher solids content (such as about 28% by weight). Next, the slurry is converted using the process described in U.S. Pat. No. 6,685,974. Thereafter, the product may be diluted to decrease the solids concentration (such as by the addition of water at a ratio of about 1:1) prior to the centrifuge steps to make the clarified syrup product. It has been found that this is a more efficient way to make the initial conversion syrup.

Upon achieving a Brix reading of about 50, the vacuum is removed and the oat-based functional syrup may be heated to a temperature of about to 82° C. Such a process has been found to produce caramelization of the oat-based functional syrup.

It has been found that the oat-based functional syrup will continue to lose virtually all 'oaty' or 'grainy' type flavors as the oat-based functional syrup is condensed. Upon continued evaporation and increasing the temperature, the oat-based functional syrup will develop distinct maple then caramel flavors.

In certain embodiments, the final condensed oat-based functional syrup has a concentration of between about 65 and 72 Brix. The Brix and solids level can continue to be increased to higher levels if desired such as to attain a solids concentration of between about 78 and 82 percent by weight.

It has been discovered that holding the syrup at higher temperatures starting at 50 Brix, the oat-based functional syrup will develop strong caramel flavors as well as the appearance of caramel candy (caramel color). This is accomplished by holding the 50 Brix syrup at a product temperature of between about 82° C. and 93° C. without vacuum, for between about 15 and 20 minutes in a batch or single effect evaporator.

The oat-based functional syrup will develop the desired caramel flavor and color. The intensity of the color is affected by how long the syrup is held at this higher temperature. After the caramelization step, the temperature is reduced to between about 49° C. and 54° C. and the vacuum resumed at up to about 69 centimeters Hg.

The oat-based functional syrup will then quickly attain a solids level of 65 to 77 Brix (whatever is desired). In a double effect evaporator, the solids and flavor will be developed in the first evaporator and finished in the second evaporator to the desired solids level.

Alternatively, the caramelization step can be performed separately once the syrup attains about 50 Brix. In this process, the syrup is evaporated as a first step to about 50 Brix, the material transferred to a separate vessel in which the material is heated to between about 82° C. and 93° C. for the desired flavor and color development. The material is then transferred back to the evaporator to finish the product to a high solids syrup.

The product and method of the present invention are described in the following examples. These examples are provided as an illustration of the invention and are not intended to limit the invention.

Example 1

A single effect, batch evaporator was fed a centrifuged decantant oat-based functional syrup with a solids level of about 25% by weight and a glucose level of between about 16% and 18% (or a DE of about 60) to a level in the evaporator which covered the heating elements at the bottom of the evaporator. In certain embodiments, the evaporator's working volume was approximately 38 liters.

The low solids oat-based functional syrup was gradually fed into the evaporator as water was evaporated at 49° C. with a pressure of between about 51 and 69 centimeters Hg vacuum until the batch evaporator reached the working volume.

When the solids content achieved 51 Brix, the vacuum was shut off and the product temperature was increased to between about 80° C. and 88° C. The product thereafter changed from a strong cereal off-flavor to a bland flavor and continued to produce maple and caramel flavors with a simultaneous change in color from the original tan to a caramel color.

Stronger caramel flavor was produced by continuing the conditions for about 20 minutes until a strong caramel flavor devoid of burned notes was produced. The temperature was then reduced to about 54° C. and the vacuum resumed at about 69 centimeters Hg at which the solids level rapidly achieved 70 Brix.

A similar result was obtained using a double effect evaporator operated with continuous feed wherein the base syrup was pre-heated to about 88° C., operated until the Brix level was about 50 and then finished in the second evaporator at about 60° C. and a vacuum of about 51 centimeters Hg.

Example 2

Clarified Syrup Product

A syrup product was produced as in Example 1 except the syrup base material was subjected to higher centrifugal force using a stacked disk separator (Alfa Laval) to reduce suspended solids by about 50% more than that in Example 1. This material was then fed to a single effect batch evaporator to a level which covered the heating elements at the bottom of the evaporator. The evaporator's working volume was about 38 liters.

The product was evaporated as in Example 1. The condensed syrup resulting from the higher centrifugal force treatment of the base material had greater sweetness impact as evaluated by tasting the product and more intense caramel flavor than the product made per Example 1.

Example 3

Lower Conversion Syrup

A syrup product was prepared using the process described in U.S. Pat. No. 6,685,974. The oat flour comprised 25% of the slurry on a weight to weight basis. The slurry was treated per the conversion process described in U.S. Pat. No. 6,685,974 to approximately one-half the sugar content of Example 1.

The sugar level was about 9% wt/wt as glucose and had a DE of between about 25 and 30. The reaction is stopped by chilling the slurry to a temperature of between about 4° C. and 27° C. The cooled slurry was then centrifuged using the process set forth in Example 1.

Next, the centrate or liquid portion was heat-treated at a temperature of at least about 82° C. using processes common in the industry such as plate and frame heat exchangers. In this manner, the sugar producing reaction was halted and lower DE maintained.

The centrate was then condensed using a process that was similar to the process set forth in Example 1 to produce a syrup with much lower sweetness and sugar content but having good binding properties for making products such as food bars.

Example 4

High Clarified, Lower Conversion Syrup

A syrup product was prepared using the process described in U.S. Pat. No. 6,685,974. The oat flour comprised 15% of the slurry on a weight to weight basis. The slurry was treated using the conversion process discussed in U.S. Pat. No. 6,685,974 to approximately one-half the sugar content of Example 1.

The sugar level was about 4.2% wt/wt as glucose and had a DE of between about 25 and 30. The reaction was stopped by chilling the slurry to a temperature of between about 4° C. and 27° C. The cooled slurry was then centrifuged using the process set forth in Example 1.

Next, the centrate or liquid portion was heat-treated at a temperature of at least about 82° C. using processes common in the industry such as plate and frame heat exchangers. In this manner, the sugar producing reaction was halted and lower DE maintained.

The centrate was then condensed using a process that was similar to the process set forth in Example 1 to produce a syrup with much lower sweetness and sugar content but having good binding properties for making products such as food bars.

Example 5

High Maltose Syrup

A base syrup slurry with a solids level of 25% wt/wt was produced using a process that is similar to the process set forth in U.S. Pat. No. 6,685,974 except that fungal alpha-amylase was used instead of bacterial alpha-amylase.

After conversion using the process set forth in U.S. Pat. No. 6,685,974, the sugar content of the slurry was approximately 40% maltose and 60% glucose. Next, the slurry was centrifuged and evaporated using the method set forth in Example 1.

The syrup product maintained the ratio of maltose to glucose and, as a result, was less sweet since maltose is about 10% less sweet than glucose. This type of syrup is desirable by food formulators who wish to lessen the sweetness impact of their product while retaining the high conversion syrup properties.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A process for forming a syrup product that is suitable for use in a food product, wherein the process comprises:
    preparing a base formulation having a major amount of an oat material;
    milling the base formulation to a granulation of less than #100 U.S. mesh;
    mixing the base formulation and water to form a slurry;
    mixing at least one enzyme into the slurry;
    cooking the slurry to convert the slurry into an intermediate product;
    diluting the intermediate product through the addition of water to a solids concentration of about 14 percent by weight;
    passing the diluted intermediate product through a decanter to separate a decantant from the intermediate product;
    heating the decantant to a temperature of at least 82° C.;
    centrifuging the decantant to produce a clarified decantant; and
    evaporating the clarified decantant at a temperature of between about 45° C. and about 60° C. and a reduced pressure of between about 51 and 69 centimeters mercury to produce a syrup product, wherein the syrup product has a solids level of at least 65 Brix and a caramel color.

2. The process of claim 1, wherein the syrup product exhibits a color, a flavor and a texture that are each similar to caramel.

3. The process of claim 1, and further comprising:
    reducing the temperature to between about 52° C. and about 56° C.; and
    maintaining the pressure between about 51 and 69 centimeters mercury until the syrup product exhibits a solids level of about 70 Brix.

4. The process of claim 1, wherein the evaporation is performed using a double effect evaporator.

5. The process of claim 1, and further comprising milling the base formulation to a fine granulation so that less than 10 percent of the base formulation is retained on a #200 U.S. mesh screen.

6. The process of claim 1, wherein the at least one enzyme comprises alpha-amylase and glucoamylase.

7. The process of claim 1, wherein the at least one enzyme comprises fungal alpha-amylase.

8. The process of claim 1, wherein the oat material comprises whole oat flour, low bran oat flour, patent oat flour, partially milled oats, oatmeal and combinations thereof.

9. The process of claim 1, and further comprising mixing at least one additional starch sources into the base formulation, wherein the starch sources comprise corn flour, wheat flour, rice flour, barley flour, potato flour, or combinations thereof, wherein the additional starch sources comprises a minor amount of the base formulation.

10. The process of claim 1, and further comprising filtering the intermediate product to remove unconverted portions of the slurry.

11. The process of claim 1, wherein the intermediate product has a solids concentration of about 25 percent by weight and a glucose concentration of between about 16 and 18 percent.

12. A process for forming an oat-based functional syrup, the process comprising the steps of:
    mixing a major amount of low bran oat with a minor amount of a starch source to form a base formulation, wherein the starch source is oat flour, corn flour, wheat flour, rice flour, barley flour, potato flour, or combinations thereof;
    milling the base formulation;
    separating material having a granulation of more than #100 U.S. mesh from the base formulation, wherein separating reduces a bran concentration in the base formulation by more than 50 percent by weight;
    blending the base formulation with water to form a slurry;
    mixing an effective amount of an alpha-amylase enzyme into the slurry;
    mixing an effective amount of a glucoamylase enzyme into the slurry;
    cooking the slurry to convert the slurry into an intermediate product;
    diluting the intermediate product through the addition of water to a solids concentration of about 14 percent by weight;
    passing the diluted intermediate product through a decanter to separate a decantant from the intermediate product;
    heating the decantant to a temperature of at least 82° C.;
    centrifuging the decantant to produce a clarified decantant; and
    evaporating the clarified decantant at a temperature of between about 45° C. and about 60° C. and a reduced pressure of between about 51 and 69 centimeters mercury to produce a syrup product and once the syrup product has a solids level of at least 65 Brix and a caramel color.

13. The process of claim 12, wherein the syrup product exhibits a color, a flavor and a texture that are each similar to caramel.

14. The process of claim 12, and further comprising:
    reducing the temperature to between about 52° C. and about 56° C.; and maintaining the pressure between about 51 and 69 centimeters mercury until the syrup product exhibits a solids level of about 70 Brix.

15. The process of claim 12, wherein the evaporation is performed using a double effect evaporator.

16. The process of claim 12, wherein the at least one enzyme comprises alpha-amylase and glucoamylase.

17. The process of claim 12, wherein the intermediate product has a solids concentration of about 25 percent by weight and a glucose concentration of between about 16 and 18 percent.

* * * * *